United States Patent [19]

Uchiyama et al.

[11] Patent Number: 4,465,710

[45] Date of Patent: Aug. 14, 1984

[54] PROCESS FOR THE MANUFACTURE OF POLYURETHANE-COATED PRODUCTS

[75] Inventors: Toshihiko Uchiyama, Yokohama; Eizō Yoshida, Chigasaki; Toshiki Okuyama, Naka, all of Japan

[73] Assignee: Nissan Motor Company, Limited, Yokohama, Japan

[21] Appl. No.: 298,624

[22] Filed: Sep. 2, 1981

Related U.S. Application Data

[63] Continuation of Ser. No. 122,768, Feb. 19, 1980, abandoned.

[30] Foreign Application Priority Data

Feb. 20, 1979 [JP] Japan ................................. 54-18705

[51] Int. Cl.³ .......................... B05D 3/00; B05D 3/12
[52] U.S. Cl. ..................................... 264/46.5; 72/42; 72/46; 427/373; 427/388.1; 427/399; 427/327; 29/527.4; 264/135; 264/DIG. 3
[58] Field of Search ............... 427/399, 435, 417, 409, 427/333, 327, 302, DIG. 3, DIG. 7, 388.2, 373, 385.5, 388.1, 443, 426; 428/457, 425.8, 423.1, 422.8; 72/42, 46; 252/56 R

[56] References Cited

U.S. PATENT DOCUMENTS

| | | | |
|---|---|---|---|
| 2,779,689 | 1/1959 | Reis | 427/426 |
| 2,866,722 | 12/1958 | Gensel et al. | 427/373 |
| 2,903,380 | 9/1959 | Hoppe et al. | 427/302 |
| 3,208,945 | 9/1965 | Stuart et al. | 252/56 R |
| 3,568,486 | 3/1971 | Rosenberg et al. | 427/409 |
| 3,734,784 | 5/1973 | Bereday et al. | 427/327 |
| 3,826,675 | 7/1974 | Smith et al. | 427/388.1 |
| 4,009,307 | 2/1977 | Erikson et al. | 427/388.1 |
| 4,160,851 | 7/1979 | Lienert et al. | 427/409 |

*Primary Examiner*—Sadie L. Childs
*Attorney, Agent, or Firm*—Schwartz, Jeffery, Schwaab, Mack, Blumenthal & Koch

[57] ABSTRACT

A process for manufacturing polyurethane-coated products is disclosed. These polyurethane-coated products are manufactured by press-forming a metal material coated with a lubricant inclusive of a compound having an oxygen-hydrogen bond into a core member of a desired shape and covering necessary portions of the core member a with polyurethane foam or coating formed by reacting the compound with an isocyanate of the polyurethane forming material without degreasing steps, i.e. pretreatments for washing off the lubricant.

20 Claims, 2 Drawing Figures

PROCESS FOR THE MANUFACTURE OF POLYURETHANE-COATED PRODUCTS

This is a continuation of application Ser. No. 122,768, filed Feb. 19, 1980, now abandoned.

BACKGROUND OF THE INVENTION

This invention relates to a process for manufacturing polyurethane-coated products wherein a metal material is press-formed into a core member of a desired shape and then the core member is covered with polyurethane foam in place.

The process of this type, i.e. the process, wherein a metal material is press-formed into a core member of a desired shape and thereafter the desired portions of the core member are covered with polyurethane foam, is applied to the manufacture of bumpers and the like as well as internal automotive trim parts such as instrument panel pad, seat, overhead consolebox, door trim, armrest, kneepad and the like.

For example, when the instrument panel pad is manufactured by press-forming a metal material into a core member of a desired shape and then covering the surface of the core member with polyurethane foam, it has hitherto been the practice that a metal material (usually steel plate or galvanized steel plate), which is coated with a rust preventing oil for preventing the generation of rust during the transportation or keeping in the warehouse, is first subjected to a blanking step, coated with a press-forming lubricant (high-viscosity lubricant composed mainly of a mineral oil, for example, trade name "G 634" made by Nippon Kosakuyu Kabushiki Kaisha or the like) and then press-formed into a desired shape. Then, the thus press-formed metal material, has been covered at its necessary surface portions as a core member (which is usually called an insert member) with polyurethane foam. In order to obtain satisfactory adhesion between the core member and the polyurethane coating, however, it was believed to be important that the rust preventing oil previously adhered to the steel surface and the press-forming lubricant applied before the press-forming be completely removed from the surface of the core member and hence the degreasing step is required. The order of production steps for the instrument panel pad is shown in the following Table 1. Such an order of the prior art has drawbacks as mentioned below:

1. The step order becomes complicated. (A number of steps are required and labor is largely consumed.)
2. In order to provide a satisfactory adhered state between the press-formed core material and the polyurethane material after the use of the press-forming lubricant composed mainly of a mineral oil, it is necessary to effect a degreasing and cleaning step for completely removing the rust preventing oil and the press-forming lubricant as mentioned above.
3. Since the press-forming lubricant composed mainly of the mineral oil has frequently a high viscosity so as to sufficiently facilitate the drawing operation, this causes troubles such as partial degreasing or insufficient degreasing and the like. As a result, much labor and time is required to complete the degreasing step.

The degreasing step is commonly considered by those skilled in the art to be essential because it is generally necessary to effect a pretreatment for surface degreasing and cleaning prior to the adhering as shown in ordinary articles, for example, *Handbook of Adhesive Technology*, Kikkan Kogyo Shinbunsha, July 1963, p 18 et seq. and *Polyurethane Resin*, Nikkan Kogyo Shinbunsha, 1969, pp 115 and 239. That is, the concept that the degreasing step is an essential step has not been examined to make adhesion complete, widespread in the art and is substantially normalized. As a result, countermeasures for the degreasing step at all.

In general, the surface of the metal material, which is an adherend, is frequently covered with a thin film of an oxide or a hydroxide, or may adsorb various substances. Further, the surface of the adherend is usually contaminated with oils used for rust prevention, oils used for the cutting or rolling, and the like. In this case, these oils are removed with a solvent, a detergent, an acid or an alkali because they adhere to the adherend in a large quantity and considerably reduce the adhesive strength. When using the solvent, however, the partly adhered oil may be spread over the whole surface of the adherend, so that the repeated washing is carried out by successively exchanging the used detergent for new ones. Further, when using the alkali or detergent, these substances remain at the surface of the adherend and hence may reduce the adhesive strength.

SUMMARY OF THE INVENTION

It is, therefore, an object of the invention to solve the above mentioned drawbacks of the conventional production steps, wherein the metal material is press-formed into a core member of a desired shape and then the desired portions of the core member are covered with polyurethane material in the form of foam or coating to manufacture a polyurethane-coated product, by omitting the degreasing step from the production steps.

It is another object of the invention t provide a process for the manufacture of polyurethane-coated products, which not only eliminates the drawbacks of the prior art by the mere curtailment of the steps, but also can ensure the quality of the product is equal to or higher than that of the conventional product.

The inventors have made various studies with respect to the adhesive state between the core member and the polyurethane foam or coating in order to achieve the above objects, and as a result it has been found out that satisfactory adhesion between the core member and the polyurethane foam can be secured by using a lubricant which includes a compound having an oxygen-hydrogen bond, which is considered to have a chemical affinity for isocyanate or polyol, particularly a polyol being a constituent of the polyurethane foam in the pressing of the metal material even when omitting the degreasing step for removing coatings such as the lubricant for the core member and the like, which is a necessary step in the prior art.

According to the invention, there is provided a process for manufacturing polyurethane-coated products, characterized in that a metal material coated with a lubricant inclusive of a compound having an oxygen-hydrogen bond is press-formed into a core member of a desired shape and then, without the use of a degreasing step, said compound and/or polyol is reacted with an isocyanate to make a polyurethane material on necessary portions of said core member with the resulting polyurethane foam or coating.

The term "oxygen-hydrogen bond" used herein means to include a hydroxyl group, a carboxyl grou and the like, which are capable of reacting with the isocyanate group in the formation of polyurethane. For convenience' sake, the invention will be described with reference to the compound having a hydroxyl group below.

The invention will be described in greater detail with the manufacture of instrument panel pads. The production steps of the invention are also shown together with those of the prior art in Table 1.

the slush molding of vinyl chloride. And also, skin formed by the application of vinyl chloride sol or skin made from the foamed urethane itself (so-called integral skin) may be used.

According to the invention, the polyurethane foam is produced by the reaction of polyol, isocyanate and

TABLE 1

Comparison of steps in the manufacture of instrument panel pad

| | Prior art | | Invention | | |
|---|---|---|---|---|---|
| Pre-treatment | Application of rust preventing oil for core member<br>Transportation, keeping<br>Blanking<br>Application of press-forming lubricant | Pre-treatment | Application of rust preventing oil for core member<br>Transportation, keeping<br>Blanking<br>Application of press-forming lubricant coating OH group | Pre-treatment | Application of lubricant containing OH group for core member<br>Transportation, keeping<br>Blanking<br>(unnecessary) |
| 1 | Metal press-forming | 1 | Metal press-forming | | |
| 2 | Degreasing of lubricant and oils | | (unnecessary) | | |
| 3 | Washing and rinsing | | (unnecessary) | | |
| 4 | Drying | | (unnecessary) | | |
| 5 | Setting of core member and skin in mold | 2 | Setting of core member and skin in mold | | |
| 6 | Pouring raw materials to form polyurethane | 3 | Pouring raw materials to form polyurethane | | |
| 7 | Release | 4 | Release | | |
| 8 | Post-treatment of degreasing chemical and washing water | | (unnecessary) | | |

According to the invention, a lubricant containing hydroxyl group is first applied to a metal material, which is then press-formed into a core member of a desired shape. In this case, the lubricant used is a solid lubricant and/or a polyol oil.

As the solid lubricant, there is preferably used a high molecular weight lubricant developed by H. A. Montgomery Corp. (trade name "MIL-BOND"), whose composition is described in U.S. Pat. No. 3,568,486.

In another preferred embodiment, various substances, for example, so-called polyols including a polyfunctional alcohol may be added to the solid lubricant.

According to the invention, there can be used various kinds of the polyol oil, an example of which is EX-1695B (trade name, made by Asahi Denka Kogyo Kabushiki Kaisha).

In the concrete embodiment, commercially available steel plates, each being coated with the solid lubricant acting as both rust preventing material in the transportation and lubricant in the press-forming followed to the manufacture of the steel plate, may be subjected to the press working as they are. If only the rust preventing oil is thinly applied to the metal material, the lubricant according to the invention is applied prior to the press working.

After a skin material is placed in a mold, the core member obtained by the press-forming as described above is located at a given position in the mold and thereafter a foam forming composition for polyurethane is poured into the mold, during which a foaming reaction is performed for a given time, whereby a foam structure comprising the skin and the core member coated with polyurethane material is manufactured.

In the manufacture of the instrument panel pad, the steel plate is used as a core member as mentioned above because the pad composed only of the skin and foamed urethane is poor in the rigidity and the attachment thereof is very difficult. As the skin material, common materials are ones obtained by the vacuum forming of semi-rigid ABS sheet blended with vinyl chloride or by blowing agent, which are properly selected in accordance with use purpose. There the following methods are used for injecting and foaming the composition as described above in the mold:

(1) Foaming-in-place method under a relatively low pressure, i.e. hot curing of the selected composition by heating in the foaming of cold curing of the composition at room temperature; and (2) Rapid foaming method under pressure, i.e. RIM (Reaction Injection Molding). This method is not used in the case of manufacture of the instrument panel pad.

According to the invention, the degreasing step and various steps accompanied therewith, which have been required in the prior art, can be omitted by using a core member formed by the press-forming of the metal material coated with the lubricant inclusive of a compound having a hydroxyl group when the desired surface portions of the core member are coated with polyurethane material, and also it make possible to produce a polyurethane elastomer having a satisfactory adhesion between the core member and the polyurethane and a quality equal to or higher than that of the prior art. In this case, the adhesive mechanism between the core member and the polyurethane material is believed to be as follows:

Although the adhesive theory is reported in various articles, the provision of satisfactory adhesion is not necessarily established in every case even when omitting the degreasing step. Regarding the adhesiveness between the polyurethane material and the metal material according to the invention, it has been proven that the isocyanate itself, which is a reactant for the production of polyurethane, adheres to a metal, silicate, rubber or the like, and in this case it is known that the isocyanate forms a chemically primary bond by directly bonding to a hydroxide generated by the hydrolysis of an oxide film present in the surface of the metal material. Furthermore, it is considered that the isocyanate reacts with water electrically adsorbed on the surface of the metal material to cause the adhesion as a result of the electrical adsorption. The press-forming lubricant to be used in the invention contains a compound having a hydroxyl group, which is able to react with the starting materials for polyurethane or has an affinity for the starting materials for polyurethane, as mentioned above, so that it is considered that even if the press-forming lubricant layer is existent in the surface of the metal material, the bonding between the polyurethane material and the metal surface is not only achieved, but also the lubricant itself forms a urethane bond with the isocyanate to hold the adhesion between the polyurethane and the metal surface.

On the contrary, when the press-forming lubricant composed of mineral oil is applied as in the prior art, the mineral oil has only a few of or no terminal reactive groups (carboxyl group, hydroxyl group), so that it does not react with the isocyanate and conversely it obstructs the approach the isocyanate to the surface of the metal material in the formation of so-called urethane bond when reacting the isocyanate with the hydroxide present in the metal surface or water electrically adsorbed on the metal surface, and as a result the bonding between the formed polyurethane material and the metal material is not obtained satisfactorily. Further, the conventional pressing lubricant is usually higher in the viscosity and is applied at a thicker gauge, so that it is very difficult to incorporate the isocyanate or polyol into this lubricant and consequently the bonding between the polyurethane and the metal is more obstructed. Therefore, it is considered that the degreasing step is essential in the prior art.

BRIEF DESCRIPTION OF THE DRAWINGS

The invention will now be described in greater detail with reference to the accompanying drawing, wherein.

DETAILED DESCRIPTION OF PREFERRED EMBODIMENTS

The invention will be described with reference to the following examples, comparative examples and experiment. In these examples, all parts and percentages are by weight, unless otherwise stated.

EXAMPLE 1

Figure 1:
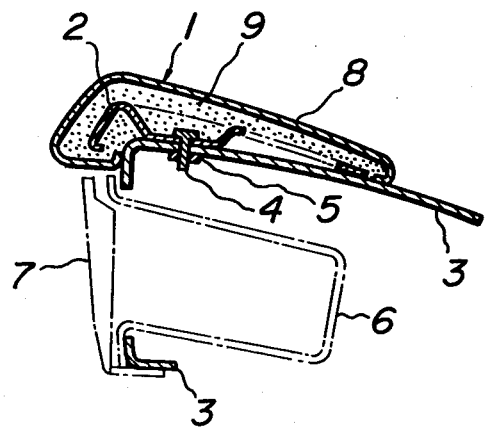
FIG. 1 is a sectional view of an instrument panel pad manufactured by the process according to the invention.

This example shows the manufacture of an instrument panel pad 1 as shown in section in FIG. 1.

The instrument panel pad 1 is secured to an upper surface of an instrument panel 3 for an automobile by means of bolt 4 and nut 5, and serves as a shock absorbing member for the human body. In this figure, numeral 6 is a glove box and numeral 7 is a lid therefor. The pad 1 has a structure wherein foamed urethane 9 is filled between a pressed core member 2 and a skin material 8.

In the manufacture of the instrument panel pad 1, a commercially available solid lubricant MIL-BOND MC-560 (trade name, made by Nippon Oil and Fats Co., Ltd.), whose composition consisting of 20 parts of commerically available acrylic acid composing of 80% polyacrylic acid and 20% methacrylic acid, 3 parts of styrene-maleic anhydride copolymer, 0.5 part of calcium stearate, 0.5 part of zinc stearate and methylene chloride sufficient to made up to 100 parts, was first applied to a steel plate in an amount of 3–5 g/m$^2$ (evenly 4 g/m$^2$). The thus treated steel plate was blanked and press-formed into the core member 2. In this case, the drawability of the steel plate was obtained at a level equal to or higher than that of using the conventional press oil (for example, commonly used high viscosity lubricant composed of mineral oil).

Figure 2:
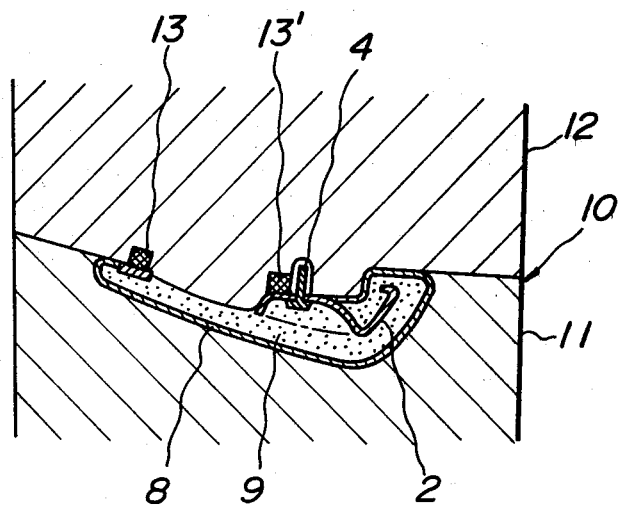
FIG. 2 is a sectional view illustrating the molding state of the instrument panel pad according to the invention.

As shown in FIG. 2, the skin material 8 (composed of a blend of vinyl chloride wwith acrylonitrile-butadiene-styrene terpolymer resin) was placed in a bottom part 11 of a mold 10, while the core member 2 was held by magnets 13, 13′ located at given positions of a top part 12 without being subjected to the degreasing. Then, a composition for the formation of the polyurethane foam 9 having a compounding recipe as shown in the following Table 2 was injected into a space defined by the skin material 8 and the core member 2 and then reacted under such conditions as shown in the following Table 3 to obtain an instrument panel pad provided with the skin.

TABLE 2

| Ingredients | Compounding amount (parts) |
| --- | --- |
| PPG3000 triol*$^1$ | 85 |
| Pluracol PeP 450*$^2$ | 15 |
| TMBDA*$^3$ | 2 |
| T - 9*$^4$ | 0.05 |
| L - 5310*$^5$ | 2 |
| Acryloid - 710*$^6$ | 0.2 |
| Water | 4 |
| Mondur MR (isocyanate index 105)*$^7$ | 95 |

Note:
*$^1$trade name of polyol (molecular weight: 3000, OH value: 56) made by Union Carbide Corp.
*$^2$trade name of polyether polyol made by Wyandotte Chemical Corp.
*$^3$N,N,N′,N″—tetramethylene-1,3-butane diamine as a catalyst, made by Union Carbide Corp.
*$^4$trade name of a catalyst, made by Union Carbide Corp.
*$^5$trade name of a blowing accelerator, made by Union Carbide Corp.
*$^6$trade name of a cell opening agent comprising an aqueous solution of polyacylic resin, made by Rohm & Haas Co.
*$^7$trade name of dimethylmethane diisocyanate (NCO: 31.5–32.0%, viscosity: 200 ± 50 cp at 25° C., acidity: ≦0.2%, vapor pressure at 25° C.: ≦1 × 10$^{-3}$ mmHg), made by Mobay Chemical Corp.

TABLE 3

| Mechanical production conditions | |
| --- | --- |
| Mold temperature | 43–49° C. |
| Curing time | 5–10 minutes |
| Foaming machine | Model, made by Mobay-Hennecke Corp. |
| Agitator | pin type |
| Mixing | low shear |
| Agitating speed | 5000 rpm |
| Mixer size | length 100 × diameter 50 mm |
| Mixer capacity | about 200 cc |
| Resin temperature | 26° C. |
| Isocyanate temperature | 26° C. |

EXAMPLE 2

The steel plate was first coated with the solid lubricant MIL-BOND MC 560 in an amount of 3–5 g/m$^2$ and then blanked, to which was applied an activator for the solid lubricant composed of 90 parts of a lard oil and 10 parts of butyl cellosolve, which is recommended as a second coating layer, by means of rolls and then scraped off with a doctor blade so that the coated amount is not more than 0.5 g/m$^2$. The thus treated steel plate was press-formed into the core member 2 and in this case, a satisfactory drawability was obtained.

Then, the core member 2 not subjected to degreasing and skin material 8 were placed in the mold 10 and the polyurethane foam 9 was formed around the core member 2 in the same manner as described in Example 1 to obtain an instrument panel pad 1 shown in FIG. 1.

EXAMPLE 3

To the steel plate coated with the solid lubricant in the same manner as described in Example 1 was applied an oil agent composed mainly of polyols, EX-1695B (trade name, made by Asahi Denka Kogyo Kabushiki kaisha) in an amount of 0.5 g/m$^2$ by means of rolls. Thereafter, the steel plate was blanked and press-formed into the core member 2. This core member 2 was set in the mold 10 without degreasing and coated with the polyurethane foam 9 in the same manner as described in Example 1 to obtain an instrument panel pad 1.

EXAMPLE 4

A commercially available steel plate coated with a solid lubricant composition of 0.2μ thick was blanked and press-formed into the core member 2. This solid lubricant composition contained 55% of solid paraffin, 20% of di-long chain alkyl ketone, 5% of fatty acid, 5% of glycerin fatty acid monoester and 15% of addition product of alkylphenol with 7 moles of ethylene oxide as described in Japanese Patent laid open No. 60,340/78. The thus obtained core member 2 was set in the mold without being subjected to a degreasing step having a specification recommended by the manufacturer for such steel plate and then an instrument panel pad 1 provided with the core member 2, the polyurethane foam 9 and the skin material 8 of vinyl chloride was manufactured in the same manner as described in Example 1.

EXAMPLE 5

To a usual steel plate (coated with a very thin film of a paraffinic rust preventing oil) was applied a polyol oil composed mainly of polyol (trade name "EX-1695B", made by Ashai Denka Kogyo Kabushiki Kaisha) in an amount of 4 g/m$^2$ in order to achieve pressing-lubrication. The thus treated steel plate was blanked and press-formed into the core member 2, which was then made without degreasing into an instrument panel pad 1 in the same manner as described in Example 1.

EXAMPLE 6

A coating solution composed of the same solid lubricant as described in Example 1 and containing 5% of polyc was applied to a steel plate in an amount of 3-5 g/m$^2$. The thus treated steel plate was blanked and a coating solution of ethylene glycol was applied thereto in an amount of 2-3 g/m$^2$ so as to form a resin-activated coating layer. Thereafter, the steel plate was press-formed into the core member 2. The core member 2 was used without degreasing to manufacture an instrument panel pad 1 in the same manner as described in Example 1.

EXAMPLE 7

The steel plate coated with the same solid lubricant as described in Example 1 was press-formed into the core member 2 of a desired shape without the application of the usual press-forming oil composed of high viscosity mineral oil. The thus obtained core member 2 was subjected to a painting finish with the following paint without degreasing and then set in the mold 10. Thereafter, an instrument panel pad 1 provided with the polyurethane foam 9 was manufactured in the same manner as described in Example 1.

The painting finish as described above is to ensure a beautiful appearance on the product locally covered with the foam.

As the paint, there was used a two-component polyurethane paint requiring no heating, which was an equivalent mixture of 130 parts of Desmodur N (trade name, made by Bayer A. G., 75%) and 100 parts of Desmophen #800 (trade name for a branched polyester polyol, made by Bayer A. G.). As a coloring agent, use may be made of an inorganic pigment, a dyestuff and the like, but the kind of the coloring agent in this example is small in a direct relation to the process of the invention.

COMPARATIVE EXAMPLE 1

A steel plate was coated with a rust preventing oil composed of a mineral-oil based spindle oil (Antirust P2100, trade name, made by Nihon Sekiyu Kabushiki Kaisha) and subjected to a blanking. The thus treated steel plate was further coated with a commonly used press-forming lubricant composed of high viscosity mineral oil (for example, paraffinic oil #660 made by Nippon Kosakuyu Sha or the like) in a minimum required amount and then press-formed into a core member 2.

The thus obtained core member 2 was placed into the mold 10 without being subjected to a usually required degreasing treatment and the a polyurethane foam 9 was formed together with a skin material 8 composed of a blend of vinyl chloride-ABS resin in the same manner as described in Example 1 to obtain an instrument panel pad 1.

COMPARATIVE EXAMPLE 2

A steel plate coated with the same solid lubricant as used in Example 1 was press-formed into a core member 2 and then subjected to a spraying-type degreasing treatment under the following conditions:

Degreasing conditions: 1.5% of Ridorin #16 made by Nippon Paint Kabushiki Kaisha, pH=10.2, bath temperature=55°–65° C., spraying pressure=2 kg/cm$^2$, time=2 minutes.

After the degreased solution was thoroughly washed away, the wettability of the steel surface was visually confirmed by the presence of water repelling. Thereafter, the sufficiently clean surface of the steel plate was obtained by drying.

The subsequent procedure was repeated in the same manner as described in Comparative Example 1 to obtain an instrument panel pad 1.

COMPARATIVE EXAMPLE 3

The steel plate coated with the same solid lubricant as described in Example 1 was press-formed into a core member 2 in the same manner as described in Example 7. The thus obtained core member was subjected to a degreasing treatment under the same conditions as described in Comparative Example 2 prior to the painting finish. After the surface of the core member was confirmed to be clean by thoroughly washing the degreased solution with water, the core member was painted with the same two-component polyurethane paint as described in Example 7. The thus painted core member 2 was placed in the mold 10 and a polyurethane foam 9 was formed therearound to obtain an instrument panel pad 1.

EXPERIMENT

The adhesion state between the core member 2 and the polyurethane foam 9 and the bonding state of the paint coating in Example 7 and Comparative Example 3 were examined with respect to the instrument panel pads of Examples 1-7 and Comparative Examples 1-3 to obtain a result as shown in the following Table 4. In Table 4, the [⊚] symbol denotes excellent results, [O] good results, and [x] stands for poor results. In the row entitled "Confirmation of foam adhesiveness (average)," the numerical values are expressed in kg/cm².

TABLE 4

|  |  | Example |  |  |  |  |  |  | Comparative Example |  |  |
|---|---|---|---|---|---|---|---|---|---|---|---|
|  |  | 1 | 2 | 3 | 4 | 5 | 6 | 7 | 1 | 2 | 3 |
| Adhesiveness of an adhesive tape when placing the pressed metal material in the mold*¹ |  | O | x | x | O | x | x | O | x | O | O |
| Heat resistant test | 110° C. × 4 hours × 2 cycles | O | O | ⊚ | ⊚ | O | O | O | x | O | O |
| Heat cycle test | 104° C. × 4 hr → Room temperature 0.5 hr → −30° C. × 1.5 hr → room temperature × 2 cycles | no peeling or the like |  |  |  |  |  |  | x | O | O |
| Moisture resistant property | 70° C. 95% relative humidity 8 hours | ⊚ | ⊚ | ⊚ | ⊚ | O | ⊚ | O | x | O | O |
| Confirmation of adhesiveness*⁴ | failure state | cohesive failure*² |  |  |  |  |  | Cross cut*⁵ 95/100 | Inter-laminar failure at metal surface | Cohesive failure | Cross cut 95/100 |
| Confirmation of foam adhesiveness (average)*³ |  | (up to a foam density of 0.16 g/cm²) 4.4 (up to a foam density of 0.32 g/cm²) 10.3 |  |  |  |  |  |  |  |  |  |

The symbol ⊚ represents excellent, o represents good and x represents poor.

Note
*¹Nichiban masking tape #241 made by Nichiban Kabushiki kaisha
*²The failure state is not a failure between the metal and the foam layer but a cohesive failure of the foam layer. Therefore, the adhesion is sufficient.
*³The foam adhesiveness is dependent upon the foam density. The measured values of the foams in Examples 1-6 are equal to those described in the articles, so that there the lowering of the foam strength by the omission of the degreasing step is not observed. The numerical results are in units of kg/cm².
*⁴A U-shaped notch was formed in the polyurethane foam of about 10 mm thick adhered on the steel plate of 1.6 mm thick so as to place the notch at the surface of the steel plate. Separately, there was provided an L-shaped steel plate. This L-shaped steel plate was inserted into the U-shaped notch until the short side portion of the L-shaped steel plate arrived at the surface of the steel plate. Thereafter, the adhesion between the steel plate and the foam was measured by peeling off the foam in a direction perpendicular to the steel plate. In the measurement, a spring balance may conveniently be used. In this case, the failure state is a so-called cohesive failure of the foam layer, which shows that the adhesive strength between the steel plate and the foam is larger than the strength of the foam.
*⁵Adhesive test of the paint coating according to JIS K-5400.

From the data of Table 4, it can be seen that the adhesion between the core member and the polyurethane foam in the products of Examples 1-7 is sufficient in practical use though the degreasing step is omitted.

The reason why the satisfactory result is obtained in each Example is considered to be as follows.

In Examples 1 and 7, it is considered that the solid lubricant consisting mainly of acrylic acid and applied to the steel plate can provide a practically sufficient adhesive strength to the polyurethane-coated product because acrylic acid is usable as a vehicle for paint and effectively acts as an adhesive between the polyurethane foam layer and the metal layer. That is, the terminal carboxyl groups (—COOH) of acrylic acid contribute not only to the formation of hydrogen bond with metal, but also to the formation of crosslink with an isocyanate group (—NCO). Further, acrylic acid is active in the dissolution of, and permeation and diffusion against polyol, so that it is partly incorporated into the resulting polyurethane foam through the polyol as a medium by the reaction with the isocyanate and as a result, it may be considered that the adhesive strength is sufficiently ensured by the direct adherence between the foam and the metal. Besides, it will be considered that various intermolecular forces supplementally contribute to the provision of the sufficient adhesive strength.

In Examples 2 and 6, the lard oil or ethylene glycol is applied on the solid lubricant of Example 1, but the adhesion is hardly affected by the lard oil or ethylene glycol. Because, the lard oil contains carboxyl groups (—COOH), while ethylene glycol contains hydroxyl groups (—OH) and these groups naturally form urethane bonds wwith isocyanate groups, so that the lard oil or ethylene glycol constitutes a part of the polyurethane foam after the foaming.

In Example 3, the polyol oil is applied to the surface of the metal, but it contains polyol capable of forming urethane bond with an isocyanate group, so that the polyol oil does not prevent the adherence between the metal and the foam.

In Example 4, additive ingredients other than solid paraffin, i.e. all of long chain alkyl ketone, fatty acid, glycerin monoester of fatty acid and alkylphenol contain carboxyl or hydroxyl group capable of reacting with an isocyanate group, so that these ingredients naturally constitute a part of the resulting polyurethane foam. Therefore, the additive ingredient portions of the solid lubricant contacting the metal surface are filled with the foam and hence the metal directly adheres to the foam. If this solid lubricant is thinly applied to the metal, paraffin fuses by a heat in the formation of urethane bond and incorporates into the foam, so that the area of the foam contacting the metal surface is increased and hence the adhesion is improved.

In Example 5, the paraffinic rust preventing oil is thinly applied to the steel plate, but this oil fuses by the heat in the formation of the urethane bond and incorporates into the foam as mentioned above, so that it is believed that the adhesion is not influenced by the rust preventing oil.

In the product of Comparative Example 1, not only are the performances inferior to those of Example 1 as apparent from Table 4, but also the peeling off of the foam layer from the metal is easily caused by contacting the fingernail therewith. From this fact it is understood that the omission of the degreasing step is very difficult when using the lubricant as described in Comparative Example 1. Moreover, it can be seen that when the coating of the high viscosity press-forming oil is removed by using a sufficiently warmed alkaline degreasing solution under the following conditions and then the metal is washed with water and dried, the adhesive strength can be improved up to an extent substantially equal to that of Example 2.

Degreasing conditions: Ridroin #53S made by Nippon Paint Kabushiki Kaisha, spraying pressure=1 kg/cm$^2$, temperature=65°–70° C.

As apparent from Table 4, the product of Comparative Example 2 shows a good adhesiveness, while the product of Comparative Example 3 after the completion of the curing shows the bonding state of the paint coating equal to that of Example 7 according to the cross cut test, so that these products are insignificant in practical use. In any case, however, the degreasing step includes many problems such as degreasing equipment and accessories accompanied therewith, degreasing agent, maintenance of degreasing bath temperature, pressurerized spraying or dipping, rinsing treatment, disposal of rinsed waste liquid and the like. From this viewpoint, it is apparent that the process of the invention omitting the degreasing step is industrially superior to the prior art requiring the degreasing step.

Although the invention has been described with respect to the instrument panel pad formed by covering the metal core member with the polyurethane foam, it will be apparent to those skilled in the art that various changes and modifications may be made without departing from the scope of the invention. For instance, the invention is applicable not only to the manufacture of other automotive parts such as armrest, crush pad, sun visor, steering wheel and the like, but also to the manufacture of so-called polyurethane integral skinned foams, i.e. those formed by foaming the core material inside the skin made from the foaming resin solution. Therefore, the invention has many industrial uses.

What is claimed is:

1. A process for manufacturing a press-formed metallic article having a layer of a polyurethane resin, comprising the steps of:
   providing a core-member comprising a metallic sheet, said sheet having a thin coating of a rust-preventing oil or being free from such a coating;
   applying to said core-member a thin layer of a lubricant composition comprising a compound having an oxygen-hydrogen bond;
   press-forming said lubricated core-member into a desired shape;
   without degreasing the surface of said press-formed core-member to remove said lubricant composition, applying to the surface of said core-member a polyurethane-forming composition consisting essentially of a polyol and an isocyanate;
   reacting said polyol and said isocyanate to produce a layer of polyurethane resin on the surface of said press-formed core-member; and
   reacting said compound having an oxygen-hydrogen bond with said isocyanate to produce a urethane bond, whereby adhesion between the polyurethane resin layer and the core-member is enhanced.

2. A process as defined by claim 1, wherein said lubricated composition comprises a high molecular weight solid lubricant.

3. A process as defined by claim 1, wherein said lubricant comprises a polyol oil.

4. A process as defined by claim 2, wherein said solid lubricant comprises an acrylic acid polymer.

5. A process as defined by claim 4, wherein said solid lubricant comprises an acrylic acid/methacrylic acid polymer.

6. A process as defined by claim 1, wherein said lubricant composition comprises a mixture of solid paraffin, di-long chain alkyl ketone, fatty acid, glycerin fatty acid monoester and an addition product of alkylphenol and ethylene oxide.

7. A process as defined by claim 2, further comprising the addition of a polyol to said solid lubricant.

8. A process as defined by claim 2, further comprising the addition of a lard oil to said solid lubricant.

9. A process as defined by claim 7, wherein said polyol comprises ethylene glycol.

10. A process as defined by claim 1, wherein said core-member is free of rust-preventing oil.

11. A process as defined by claim 1, wherein said core-member has a thin coating of a rust-preventing oil comprising a paraffinic oil.

12. A process as defined by claim 1, wherein said polyurethane-forming composition further comprises a blowing agent, whereby the polyurethane resin layer formed comprises a foamed layer.

13. A process as defined by claim 12, wherein a thin layer of polymeric skin material is positioned in spaced relationship with the surface of said press-formed core-member, to form a space between said skin material and said surface, and wherein the reaction of said polyol and isocyanate in the presence of said blowing agent produces a layer of foamed polyurethane resin filling said space, whereby the resilient foamed layer includes a skin layer of said polymeric skin material.

14. A process as defined by claim 1, wherein said lubricant composition is applied in an amount between about 3 and 5 g/m$^2$ of surface area of said core-member.

15. A process as defined by claim 14, wherein said solid lubricant comprises 20 parts of an 80/20 acrylic acid/methacrylic acid polymer, 3 parts of styrene-maleic anhydride copolymer, 0.5 part of calcium stearate, 0.5 part of zinc stearate and the balance up to 100 parts of methylene cloride.

16. A process for manufacturing a press-formed metallic article having a layer of a polyurethane resin, comprising the steps of:

applying to a core member comprising a metallic sheet a thin layer of a lubricant composition comprising 20 parts of 80/20 acrylic acid/methacrylic acid polymer, 3 parts of styrene-maleic anhydride copolymer, 0.5 part of calcium stearate, 0.5 part of zinc stearate and the balance up to 100 parts of methylene chloride;

press-forming said lubricated core member into a desired shape;

without degreasing the surface of said press-formed core member to remove said lubricant composition, applying to the surface of said core member a polyurethane-forming composition consisting essentially of a polyol and an isocyanate; and reacting said polyol and said isocyanate to produce a layer of polyurethane resin on the surface of said press-formed core member and at the same time reacting said lubricant composition with said isocyanate to produce a urethane bond, whereby adhesion between the polyurethane resin layer and the core-member is enhanced.

17. A process as defined by claim 16, further comprising the application of a polyol to said lubricant.

18. A process as defined in claim 16, further comprising the application of a lard oil to said solid lubricant.

19. A process as defined by claim 16, wherein a thin layer of polymeric skin material is positioned in spaced relationship with the surface of said press-formed core member, to form a space between said skin material and said surface, and wherein the reaction of said polyol and isocyanate in the presence of said blowing agent produces a layer of foamed polyurethane resin filling said space.

20. A process as defined by claim 16, wherein said lubricant composition is applied in an amount between about 3 and 5 g/m$^2$ of surface area of said core member.

* * * * *